United States Patent
Malone et al.

(10) Patent No.: US 8,713,419 B2
(45) Date of Patent: Apr. 29, 2014

(54) ELECTRONIC PRODUCT DESIGN

(75) Inventors: Daniel R. Malone, Arlington, MA (US); Alexander K. Schowtka, Weston, MA (US); Robert Dulaney, Paxton, MA (US)

(73) Assignee: VISTAPRINT SCHWEIZ GmbH, Winterthur (CH)

( * ) Notice: Subject to any disclaimer, the term of this patent is extended or adjusted under 35 U.S.C. 154(b) by 1176 days.

(21) Appl. No.: 12/557,257

(22) Filed: Sep. 10, 2009

(65) Prior Publication Data

US 2009/0327351 A1 Dec. 31, 2009

Related U.S. Application Data

(63) Continuation of application No. 10/679,028, filed on Oct. 3, 2003, now Pat. No. 7,607,084.

(51) Int. Cl.
*G06F 17/26* (2006.01)
*G06F 17/27* (2006.01)

(52) U.S. Cl.
USPC .............................. 715/200; 705/80; 707/779

(58) Field of Classification Search
USPC ....................................................... 715/200
See application file for complete search history.

(56) References Cited

U.S. PATENT DOCUMENTS

| | | | | |
|---|---|---|---|---|
| 5,600,563 A | * | 2/1997 | Cannon et al. | 700/117 |
| 5,751,590 A | * | 5/1998 | Cannon et al. | 700/233 |
| 5,930,810 A | * | 7/1999 | Farros et al. | 715/201 |
| 6,789,252 B1 | * | 9/2004 | Burke et al. | 717/100 |
| 7,035,837 B2 | * | 4/2006 | Reulein et al. | 1/1 |
| 7,216,092 B1 | * | 5/2007 | Weber et al. | 705/26.5 |
| 8,554,650 B1 | * | 10/2013 | Bernard et al. | 705/35 |
| 2003/0149706 A1 | * | 8/2003 | Neal et al. | 707/104.1 |

OTHER PUBLICATIONS

Keutzer et al, "System-Level Design: Orthogonalization of Concerns and Platform-Based Design", IEEE, 2000, pp. 1523-1543.*

* cited by examiner

*Primary Examiner* — James J Debrow
(74) *Attorney, Agent, or Firm* — Jessica Costa

(57) ABSTRACT

Automated electronic document design systems and method for designing and modifying product templates. When a user initiates a product design session, a product template is presented for user editing and a product description identifier is assigned to the product being designed. Document templates are assembled from individual composite elements. The individual identifiers of the component elements that make up the template being viewed by the user are associated with the description identifier. Tools are provided to allow a user to change one or more of the composite elements of the template. When a user changes an element, the identifier of the newly selected element is associated with the description identifier. Component elements of one template can be individually used, as appropriate, to prepare customized templates for another part of the same document or for different documents.

17 Claims, 8 Drawing Sheets

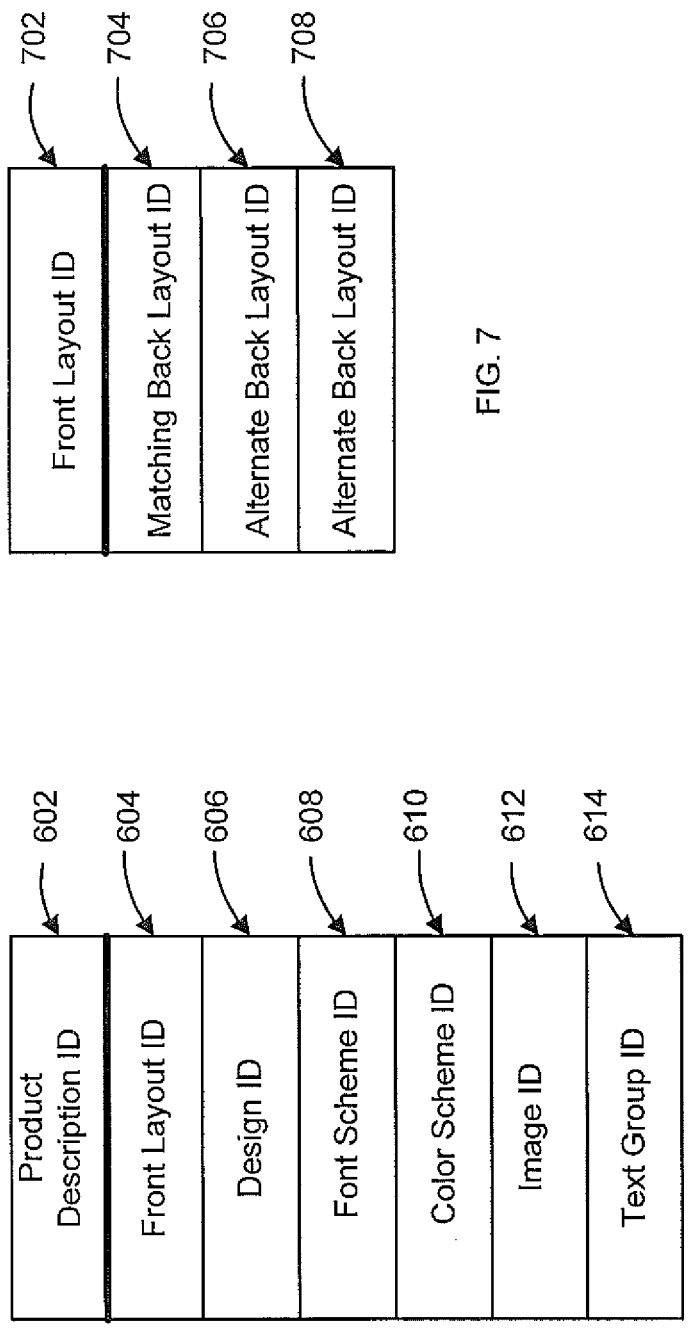

ELECTRONIC PRODUCT DESIGN

REFERENCE TO PRIOR APPLICATION

This application is a continuation of prior application Ser. No. 10/679,028, filed on Oct. 3, 2003, now U.S. Pat. No. 7,607,084 which is hereby incorporated by reference in its entirety.

FIELD OF THE INVENTION

The present invention relates to computer-implemented automated electronic product design.

BACKGROUND OF THE INVENTION

Many individuals, businesses, and organizations occasionally have a need to purchase a quantity of custom printed materials, such as birth announcements, party invitations, product or service brochures, promotional postcards, personalized holiday cards, or any number of other things. Many of these individuals and businesses turn to sources such as a local print shop while others rely on any of the various specialized software products available for purchase and installation on an appropriate computer system.

To provide an alternative to the above approaches, printing service providers, taking advantage of the capabilities of the Web and modern Web browsers, provide document design services for user's desiring to create customized documents from any computer with Web access at whatever time and place is convenient to the user. These service providers typically provide their customers with the ability to access the service provider's web site, view product templates, and enter information to create a customized markup language document. In a typical Web-based system, editing is usually limited to allowing the user to add, modify and position text and perhaps upload images for incorporation into the product design. After a document has been designed by the user, Web-based service providers also typically allow the user to place an order for the production and delivery to the user's home or business of quantities of high quality, printed documents of the type that the user is not capable of producing with the printer systems typically connected to most personal computer systems.

Pre-designed document templates that can be individually selected and downloaded to assist the user in creating a personalized document in the user's browser are known in the art. Some service providers offer templates having similar designs for a range of products so that an individual or business can design and order different products, such as business cards, letterhead, brochures, presentation folders, and return address labels, that share a common look and style. For each type of product, a number of different templates with various images and design features are provided to offer the user a range of design choices.

Traditionally, the service provider has individually designed each template by defining all details of the template, such as the position of all image and text areas in the template, selecting, sizing and positioning images in the template, defining colors to be used for template elements having a color attribute, and so forth. The template designer adjusts the elements until the designer is satisfied with the overall appearance of the template. This hand crafting of template design is time consuming and, therefore, a significant expense for the service provider. A service provider may only have the resources to produce a limited number of template variations.

When the user selects a desired template, the information required to render the template is downloaded to the user's computer system along with downloaded software tools that can be employed by the user to create a personalized electronic document. For a two-sided product, such as a folded card, the templates for the front and the inside of the card are usually provided separately with the front being provided for editing first.

There is a need for a flexible electronic document editing and customization system that allows a user greater control over the selecting and modifying the content and appearance of the document template while maintaining consistency in the appearance and style of the entire document and providing the ability to extend the user's customized document design features to other user documents.

SUMMARY

The present invention is directed to satisfying the need for systems and methods that provide flexible automated generation of electronic product designs.

In accordance with the invention, templates are constructed from individual composite elements. The identifiers of the component elements in a template are associated with a product description identifier that is associated with a user's product design session. Tools are provided to allow a user to change one or more of the composite elements of the template. When a user changes an element, the identifier of the newly selected element is associated with the description identifier. Component elements of one template can be individually used, as appropriate, to customize templates for another part of the same document or for different documents.

It is an advantage of the invention that changes to the component elements of the template for a first side of a document can be automatically incorporated into the appearance of the template for another side of the document.

It is another advantage of the invention that component elements selected by a user while editing a document template can be used to automatically generate and display additional custom documents to the user without user action.

It is yet another advantage of the invention that some or all of the component elements selected by a user for a first user document can be easily incorporated by the user into the design of a different document.

These and other objects, features and advantages of the invention will be better understood with reference to the accompanying drawings, description and claims.

BRIEF DESCRIPTION OF THE DRAWINGS

FIG. 6 is a representation of component element identifiers associated with a product description identifier in one embodiment of the invention.

FIG. 7 is a representation of backside layout identifiers associated with a front side layout identifier in one embodiment of the invention.

DETAILED DESCRIPTION

Figure 1:
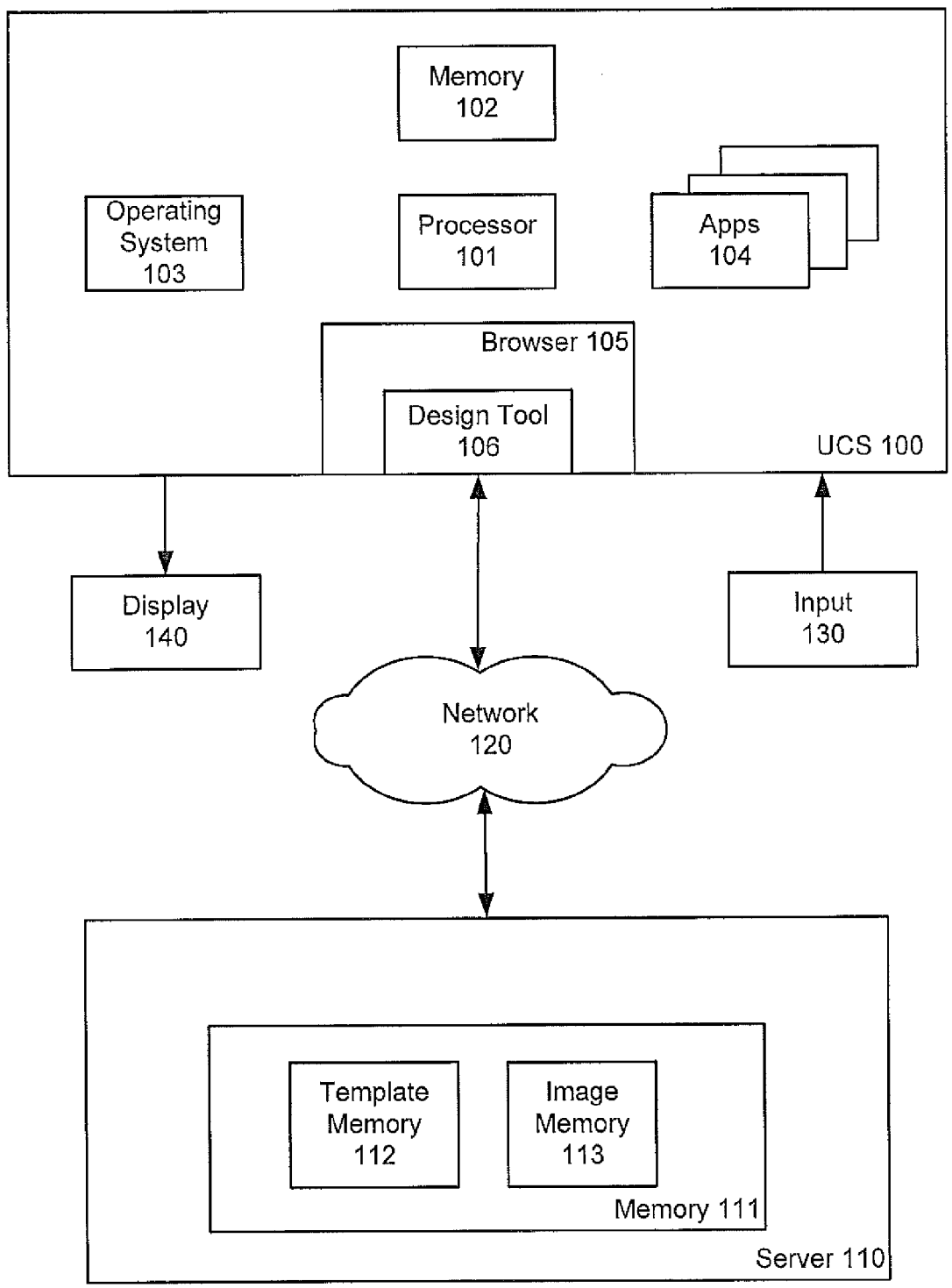
FIG. 1 is a block diagram of a computer system with which the invention may be employed.

Referring to FIG. 1, an exemplary user computer system UCS 100 includes processor 101 and memory 102. Memory 102 represents all UCS 100 components and subsystems that provide data storage, such as RAM, ROM, and hard drives. In addition to providing permanent storage for all programs installed on UCS 100, memory 102 also provides temporary storage required by the operating system and the applications while they are executing. In a preferred embodiment) UCS 100 is a typically equipped personal computer, but UCS 100 could also be a portable computer, a tablet computer or other device. The user views images from UCS 100 on display 140, such as a CRT or LCD screen, and provides inputs to UCS 100 via input devices 150, such as a keyboard and a mouse.

When UCS 100 is operating, an instance of the USC 100 operating system will be running, represented in FIG. 1 by Operating System 103. In addition, the user may be running one or more application programs. In FIG. 1, UCS 100 is running Web browser 105, such as Internet Explorer from Microsoft Corporation. Other applications that may be running in USC 100, such as spreadsheet, e-mail, and presentation programs, are represented as applications 104. In the exemplary embodiment, design tool 106 is a product design program downloaded to UCS 100 via network 120 from remote server 110, such as downloadable design tools provided by VistaPrint Limited and publicly available at vistaprint.com. Design tool 106 runs in browser 105 and allows the user to prepare a customized product design in electronic form. Alternatively, design tool 106 could have been obtained by the user from memory 102 or from another local source. When the customer is satisfied with the design of the product, the design can be uploaded to server 110 for storage and subsequent production of the desired quantity of the physical product on appropriate printing and post-print processing systems. As will be discussed in more detail below, the user creates a custom product design by customizing a template provided by the service provider and adding the user's content.

While server 110 is shown in FIG. 1 as a single block, it will be understood that server 110 could be multiple servers configured to communicate and operate cooperatively. Memory 111 represents all components and subsystems that provide server data storage, such as RAM, ROM, and disk drives or arrays. Template memory 112 contains the various layouts, designs, color schemes, font schemes and other information provided by the service provider to enable the creation and rendering of templates. Co-pending and co-owned U.S. application Ser. No. 10/449,836 entitled "Electronic Document Modification", filed May 30, 2003, describes a Web-based document editing system and method using separately selectable layouts, designs, color schemes and font schemes and is hereby incorporated by reference into this application.

Image memory 113 represents the portion of memory 111 that contains the images and related image attributes, such as the image size, the default color scheme associated with the image, and the one or more keywords that have been associated with that image by the printing service provider. To create a template, individual images are assigned to the image containers of a layout. Co-pending and co-owned U.S. application Ser. No. 10/646,554 entitled "Automated Image Resizing and Cropping", filed Aug. 22, 2003, which is hereby incorporated by reference into this application, describes a Web-based document editing system that associates images with layout containers using images that have been pre-sized to fit standard layout image containers and another system that dynamically sizes images as required to accommodate differently sized layout image containers.

Figure 2:
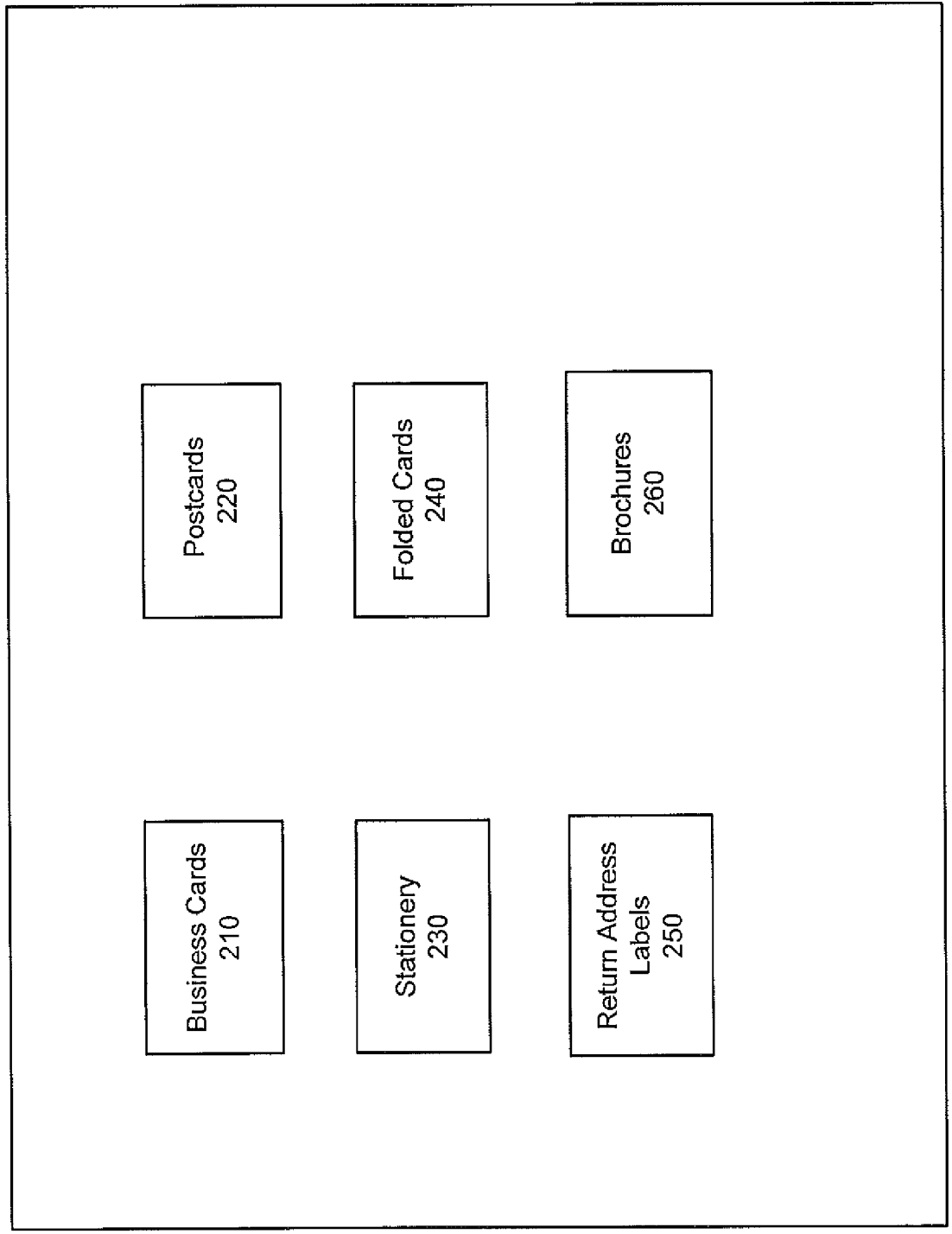
FIGS. 2-5 are schematic representations of displays presented to a user engaged in designing an electronic document.

FIG. 2 is a simplified representation of an introductory product selection page being viewed by the user of UCS 100 on user display 140. The page displays and promotes various types of products available from the service provider and offers active controls that allow the user of UCS 100 to select a desired type of product for a more detailed presentation of design options. By way of example, FIG. 2 shows promotional images for business cards 210, postcards 220, stationery 230, folded cards 240, return address labels 250, and brochures 260. Images or promotions for different or additional products, such as presentation folders, invitations, announcements, thank you cards, gift tags, and so forth could also be presented along with other information and links. It will be understood that the invention is not limited to documents that are intended for eventual printing. The invention is also applicable to the design of documents intended for use in electronic form, such as electronic business cards, online brochures, and templates for presentation graphics software programs. The invention could as well be readily adapted to a wide range of products that a user may wish to customize, such as items of clothing, product containers, promotional goods, and so forth.

For the purpose of an illustrative example, it will be assumed that the user of UCS 100 desires to create a personalized folded holiday card and, therefore, selects the folded card option, for example by clicking with the user's mouse cursor on the folded cards 240 image. The user will then be presented with one or more additional selection screens, not shown, from which the user can review the various folded card categories by general theme or subject matter and then, when the desired category is selected, review one or more pages of thumbnail images of folded card templates prepared by the service provider. When a desired template thumbnail is located, the user can click on the image to cause server 110 to download the selected template information and initiate a custom product design session. As an alternative to providing a large gallery of thumbnail template images for the user to scan, the service provider could provide a keyword searching tool to allow the service provider to display only thumbnails of templates with images or other content corresponding to the user's search terms.

Figure 3:
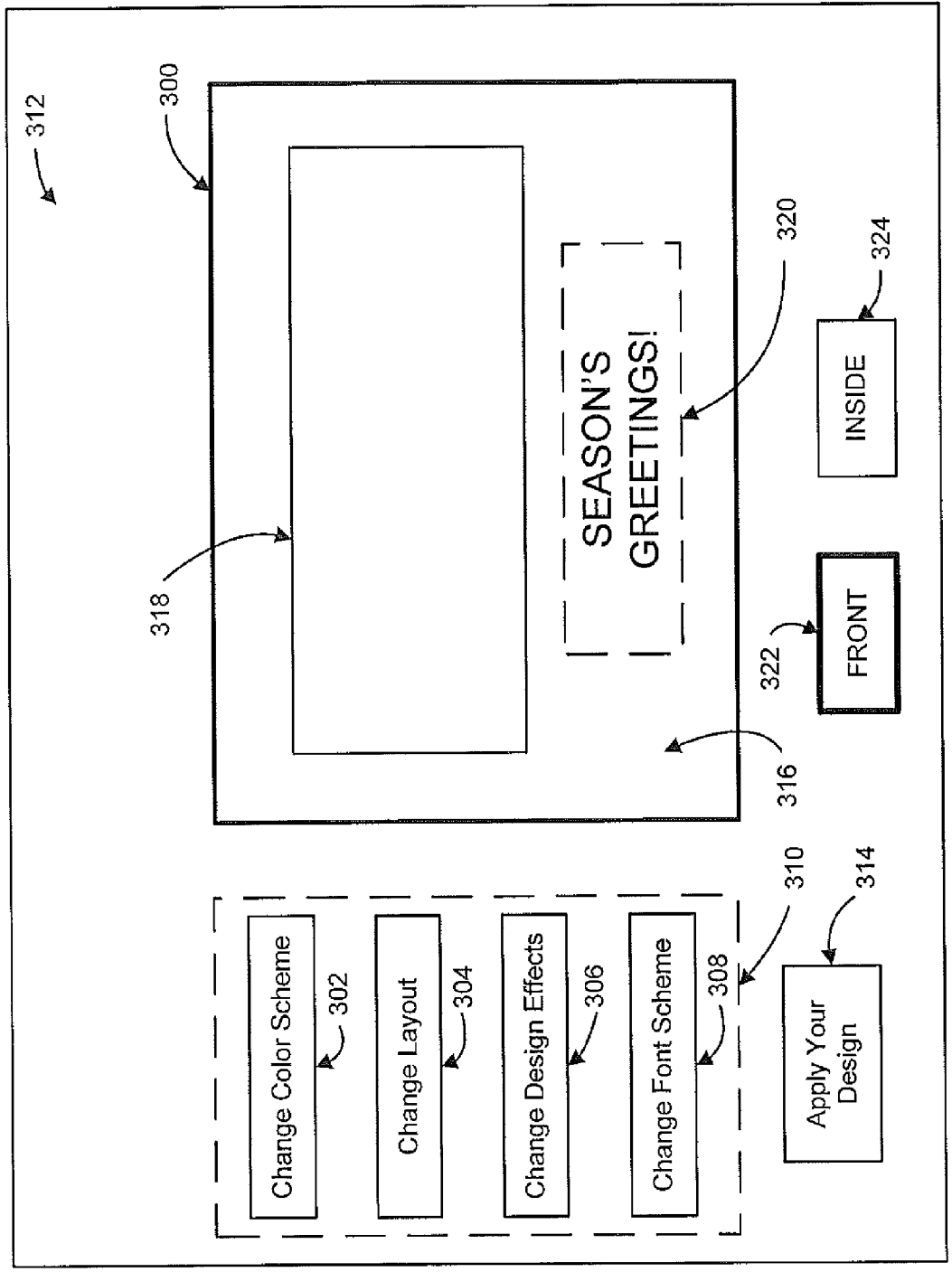

Referring to FIG. 3, when the user selects a template thumbnail that the user desires to customize, the user is presented with a larger image of the selected template 300. Template 300 may contain a wide variety and number of images, colors, graphics and other design elements. For simplicity of discussion, in the example shown in FIG. 3, template 300 contains one image 318, one textbox 320 pre-filled with relevant text, and field 316 which could be filled with a solid color or other design effect. The initial template 300 is the starting point for the user's product design. The user can not only add the user's personalized text and images, but can also, as discussed below, modify various component elements of template 300.

To allow the user to customize the card, the user is presented with template editing tools. Edit Tool Bar 312 contains various buttons, controls and menus allowing the user to add additional text boxes, insert text, change the font, change font attributes, and perform other typical editing actions. The techniques for designing and using edit tool bars are well known in the art.

Before discussing document controls 310, the structure of templates will be briefly discussed. Templates are generated from the combination of separately defined template component elements. In the embodiment discussed herein, the component element building blocks used to assemble a template image are layouts, designs, font schemes, color schemes, images, and text groups. Each layout, design, font scheme, color scheme, image and text group used by the system has a unique identifier.

As used in this embodiment, a layout is an XML description that specifies the size, position and other attributes of all product elements such as text containers, image containers, graphics, z-index values and so forth. For text containers, the layout also defines the font size and specifies the "wash" effect allowing text to be placed and read on an image. A design defines design and style information for each container in a layout. The specific information for each container will vary depending on the container contents. For example, for text containers, the design may specify the font color, the font style, font weight, and the border. For an image, the design may specify the border. For word art, the design may specify the font weight and the color. For shapes in VML or a similar language, the design may specify the border, color, path, shadow, opacity and fill image. The color scheme defines a set of complementary colors pre-selected by the service provider to be applied as a group. A font scheme is a set of complementary fonts that have been pre-selected by the service provider to be applied as a group. A text group is text that the service provider has selected to be displayed in one or more of the editable text areas of a template, such as the text group "Season's Greetings/Warn wishes for the Holidays" used to pre-fill textbox 320 in FIG. 3 and textbox 406 is FIG. 4. Some component elements may be unused for some templates, such as a template that does not contain any images or does not contain a text group.

It will be understood that the foregoing is just one embodiment of the invention. The number of component elements could be made larger or smaller and the composition of component elements could be varied. As one example, a service provider could choose to combine the functions of layout and design together into one element rather than structure them separately.

Referring again to FIG. 3, the user is also presented with additional active document controls 310 that enable the user to customize specific component features of the document. In FIG. 3, these document controls are identified as Change Color Scheme 302, Change Layout 304, Change Design Effects 306, and Change Font Scheme 308. As discussed in the above-incorporated application Ser. No. 10/449,836, these controls can be implemented in various known ways, such as dropdown menus or opening windows displaying the available choices. When the user makes a change using one of these controls, template 300 is updated to display the effect of the selected change.

It will be understood that a service provider may choose to employ more, fewer, or different document controls depending on the component elements used by the service provider and the level of customizing capabilities the service provider desires to give to the user. As will be discussed below, Apply Your Design button 314 allows the user to incorporate design choices made in connection with an earlier designed document. To indicate to the user that the user is currently editing the front of the card, Front button 322 is highlighted. When the user is ready to begin editing the inside of the card, the user can begin by clicking on Inside button 324, which will cause the inside template to be displayed.

Figure 4:
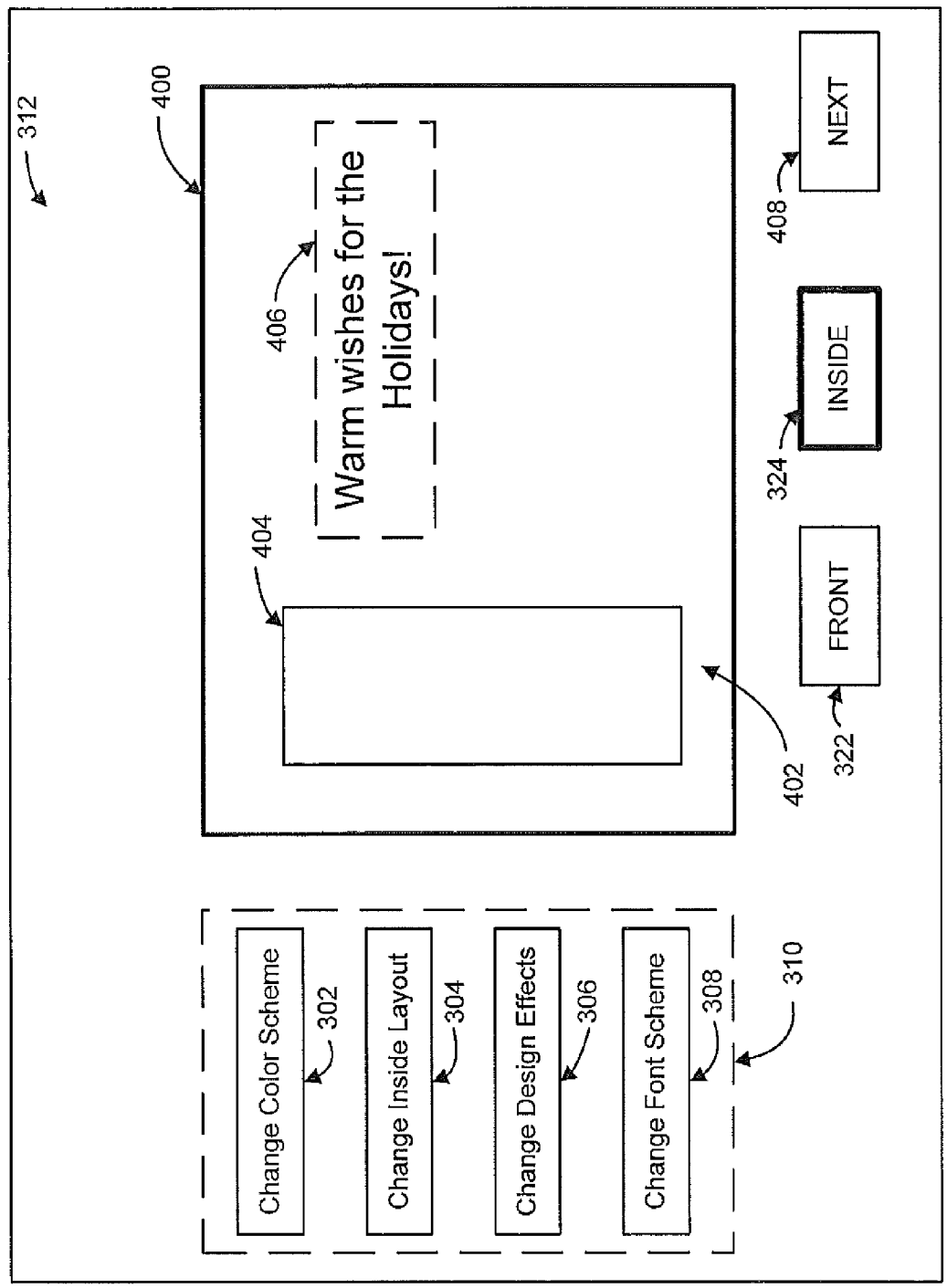

FIG. 4 represents the editing screen for the inside of the card. The user is presented with inside image 400 that, in this example, contains color field 402, image 404, and textbox 406 pre-filled with suggested relevant text relevant to the type of card being designed. For certain products, such as folded cards, the user normally wants and expects the inside of the card to be visually similar to and compatible with the outside of the card. Because the user may have made several changes to the front side template, these changes need to be reflected on the inside of the card to ensure the overall product design is aesthetically pleasing to the user. It is highly desirable to eliminate the need for the user to expend time and effort to go through the actions of manually reproducing the front side changes on the inside. To this end, a product description identifier is used to facilitate the definition of the components of the user's customized product and to allow for easy inheritance of these definitions both within the same document and by other separate documents.

This is accomplished by associating a template's individual component element identifiers with a product description identifier assigned when the user initiated the design session. In the disclosed embodiment, the product description ID is assigned from a sequential counter, but other known techniques for assigning unique identifiers could be readily employed. Referring to FIG. 6, each product description ID is associated with the identifier for each of the particular component elements that make up that document. As mentioned above, the template image 300 being viewed by the user is the result of combining the various component elements.

In the embodiment discussed herein, each product description ID 602 is associated with a front layout ID 604 representing the initial side of the document to be seen by the user during the editing process. The changes and selections made by the user on this initial side of the document will be used to control the initial appearance of the other side of the document and, as discussed below, of subsequent separate documents. Product description ID 602 is also associated with a design ID 606, a font scheme ID 608, a color scheme ID 610, an image ID 612, and a text group ID 614. If a template contains multiple images, multiple image identifiers would be associated with product description ID 602.

For any given type of product, there will be a number of possible layouts, designs, font schemes, color schemes, and so forth. Whenever a user uses one or more of document controls 310 to change one of the user-selectable component elements, the identifier of the new element is incorporated into the IDs associated with product description 602. When the user has completed any desired edits and changes to template 300 and clicks on inside 324, template 400 for the inside of the card is generated and displayed to the user.

Referring to FIG. 7, each front layout ID 702 is associated with one or more layouts for the other side of the document. The identifier of one of these layouts is designated by the service provider as the matching back layout. The layout identified by matching back layout ID 704 will be used to generate the initial inside template 400. In the example shown in FIG. 7, two alternate layouts have been identified by the service provider as being suitable for use with the front layout and are identified by alternate back layout IDs 706 and 708. Other numbers of backup layouts could be provided. If the user clicks on change inside layout 304 while editing template 400, the alternate layout IDs 706 and 708 are used to display selectable thumbnails of the two alternate inside layouts for review by the user. If the user selects one of the thumbnail images, the layout currently used in template 400 will be replaced with the alternate layout selected by the user.

The inside of the card, indicated in FIG. 4 as template 400, is dynamically generated based on the layout identified by matching back layout ID 704 associated with front layout ID 702 and the other component element IDs associated with the product description ID 602. In this manner, any changes to the color scheme or other user-selectable elements that were made by the user while editing template 300 are automatically incorporated into the inside design of the card and reflected in template 400.

In the disclosed embodiment, the user may move back and forth at will between the front template 300 edit screen and the inside template 400 edit screen using navigation buttons front 322 and inside 424. In the disclosed implementation, changes made to front template 300 are incorporated into inside template 400, but changes made to inside template 400 are not incorporated into template 300, though such an implementation could be employed if desired. When the user has completed any desired changes to templates 300 and 400 and has entered any desired personalized text or images, the user will indicate the user's intention to proceed with placing an order for production of the printed product by clicking next button 408.

Figure 5:
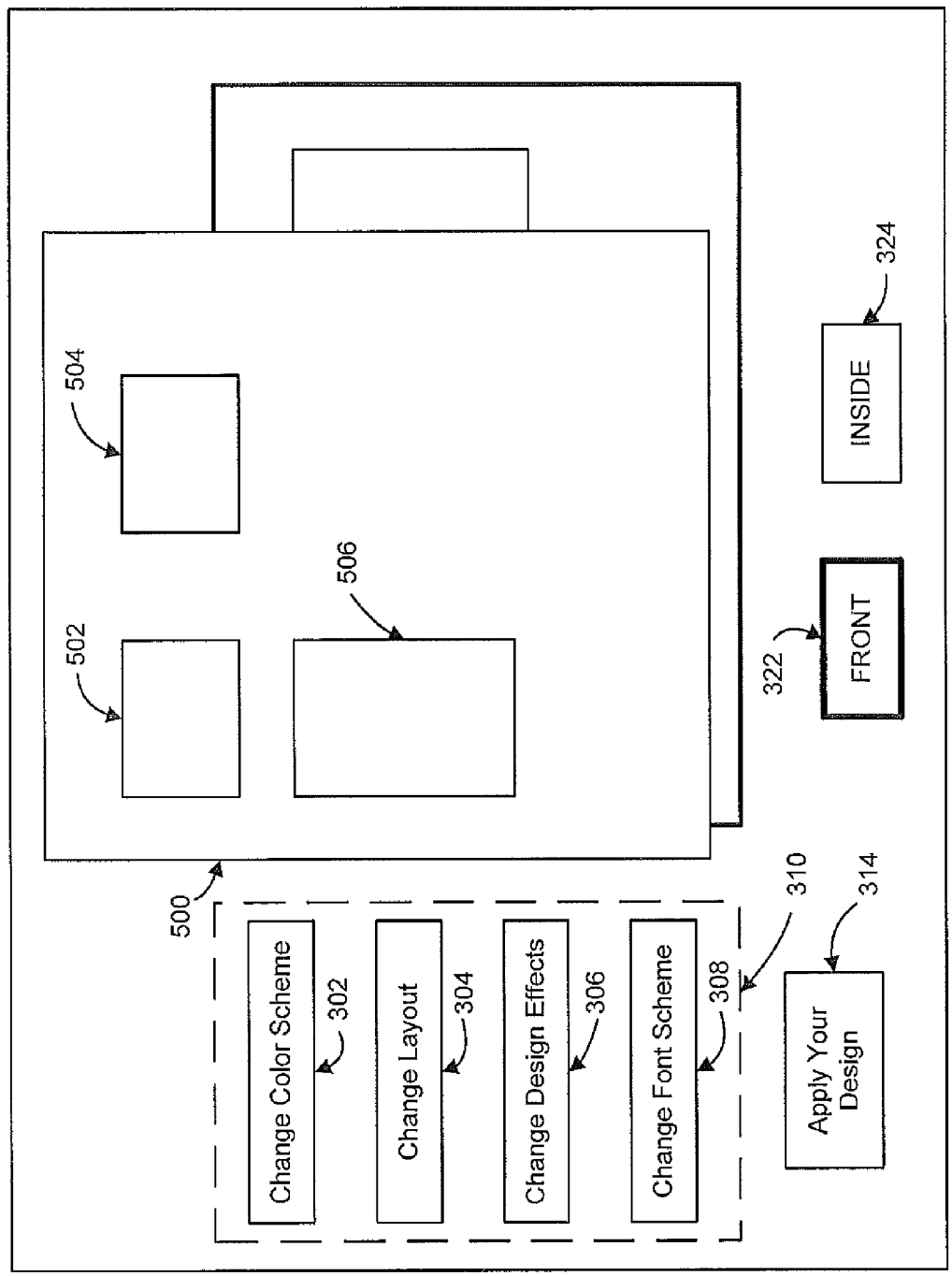

It is desirable that a user who has customized a document be able to reproduce the look and style of the document in other future documents. As mentioned above in connection with FIG. 3, apply your design button 314 is displayed to the user when the user is engaged in editing the front of the document. Referring now to FIG. 5, if a user viewing template 300 clicks on apply your design 314, a new window 500 will be displayed to the user containing images or identifiers of documents previously created in this fashion by the user. Images 502, 504 and 506 are thumbnail images of one side or page of an earlier user document. The user can review the thumbnails and, if desired, click on one of the prior document images to select it. It does not matter whether the selected document is of a different size, orientation, or layout. In response to the user's selection of a document image, the component element IDs associated with that document, excluding the product specific, elements such as the layout and the text group, are applied to the current document and are associated with the product description ID of the current document. In this manner the user can save time by quickly incorporating prior design elements into the new document, thereby allowing the user to concentrate on the specific unique content of the current document.

The invention can be applied to creating and displaying custom documents not requested by the user. After a user has completed the design of a document, the user will need to take certain actions to actually place an order for production of the physical printed product. As the user moves through the steps of order processing, the user will be required to provide various information, such as name, address, and phone number, in connection with arranging for payment and delivery of the printed version of the product. Certain of this information can be used by the service provider, in combination with the design of the product that is being ordered, to generate a different product potentially of interest to the user. For example, the user might be interested in purchasing matching return address labels containing the user's name and mailing address. The service provider can take design, font, image, and other component elements of the user's product design, combine them with a return address label layout and the user's name and address, and automatically, without user action or request, generate a customized return address label (RAL) that has design features that are similar to the product being ordered.

Figure 8:
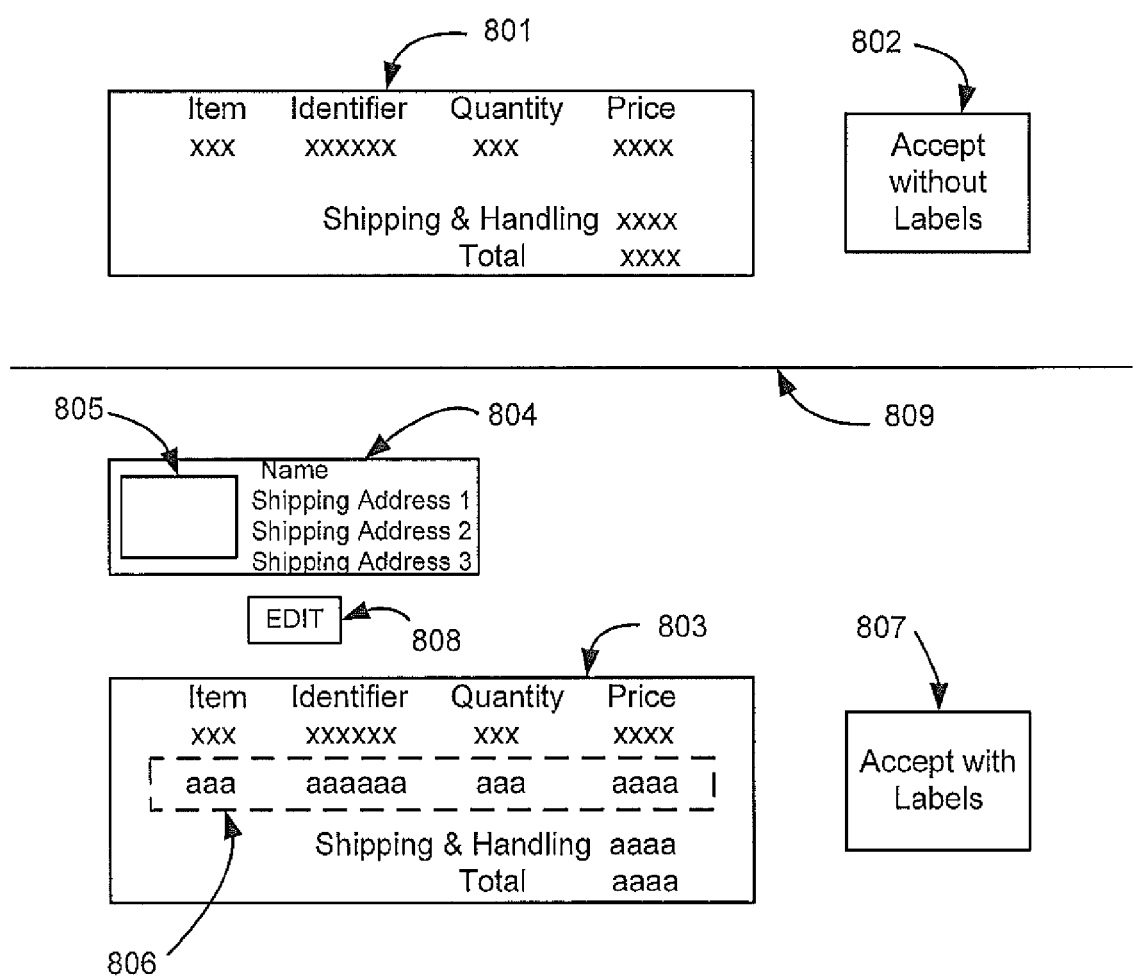
FIG. 8 is a representation of a display presented to a user when in the process of purchasing documents.

Referring now to FIG. 8, a representation of an order summary screen displayed to the user during the ordering process is depicted. The user is presented with the product, price and quantity information for the user's document in summary 801. The user is also presented with a second summary 803 that includes additional product, price and quantity information 806 related to the additional RAL product. An image of the custom RAL 804 is displayed for the user's review. Image 804 includes the user's name and shipping address, provided by the user earlier in the order process, and includes component design elements, collectively indicated by 805, corresponding to the design elements of the user's product and appropriately modified to fit the size and proportion of the RAL. Separate order buttons 802 and 807 are provided so the user can select whether to order the product together with the matching custom return address labels or order just the original product without the labels. To provide visual separation between the two purchase options, a dividing line 809 may be displayed.

For the situations where the user may desire to purchase RALs, but is not satisfied with RAL image 804 as displayed, edit button 808 is provided. If edit 808 is clicked by the user, the user is provided a RAL editing display, not shown, where the user can make any desired changes or corrections to the RAL design. Co-pending and co-owned U.S. patent application Ser. No. 10/255,531 entitled "Supplemental Product System and Method", filed Sep. 26, 2002, describes a system and method for using information supplied by a customer during the document order placement process to automatically generate and display an image of a different custom document and is hereby incorporated by reference into this application.

Figure 9:
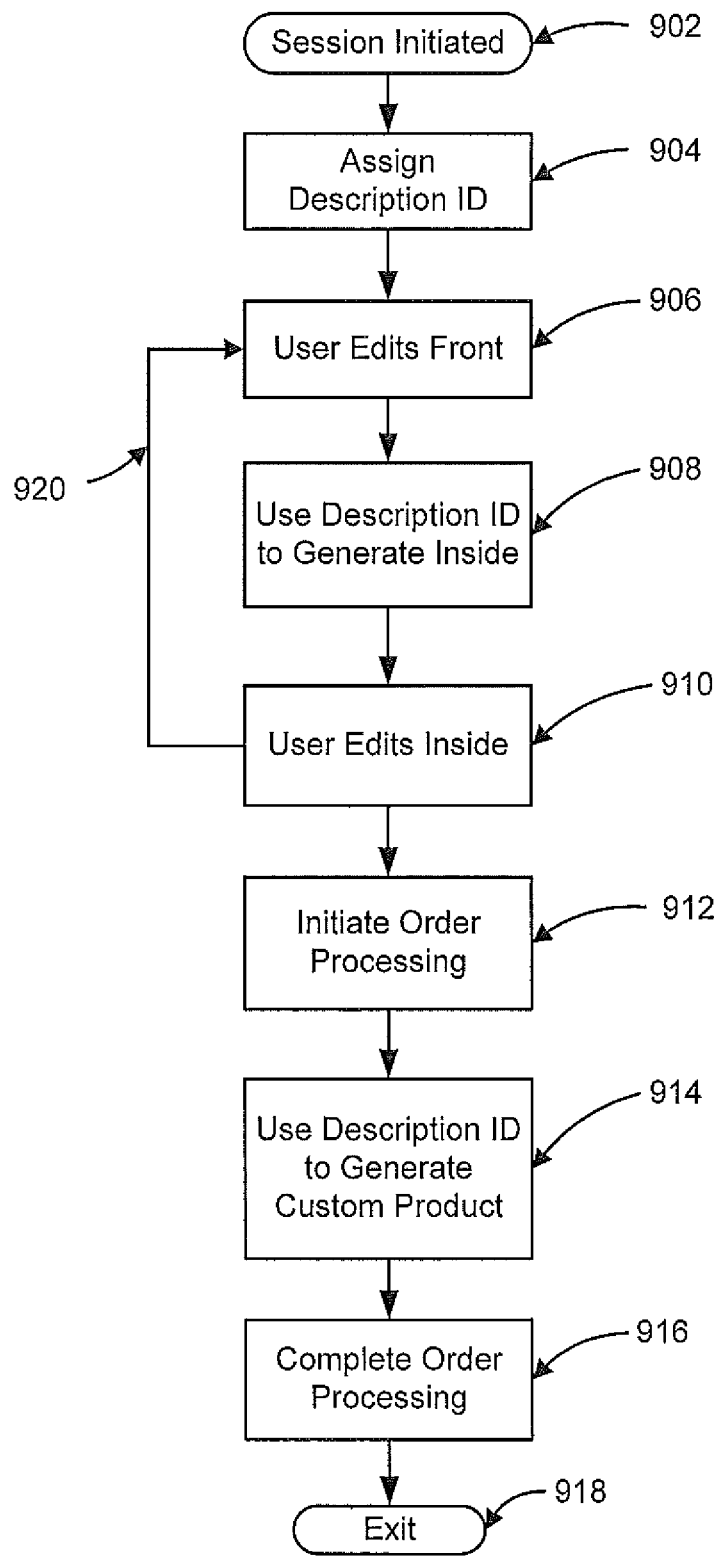
FIG. 9 is a flowchart of a product design method according to the invention.

Referring now to FIG. 9, the operation of an embodiment of the invention will be discussed. At step 902, a product editing session is initiated by a user. At step 904, a product description identifier is assigned to the user's document and associated with the identifiers of the various component elements of the document template selected by the user for customization. At step 906, the user performs the desired edit operations, which may include one or more changes to the product design using document controls 310. Step 906 may also include incorporating component elements from a user's previously designed product using apply your design button 314 as discussed above.

When the user is finished with the front side of the document and indicates a desire to edit the inside of the document, the component elements of the front side design as indicated by the identifiers associated with the product description ID are used to dynamically generate the inside template displayed to the user. The user can then perform the user's desired editing operations on the inside. As indicated by connection 920, the user may, if desired, return to the front and make further changes. When the user has completed the design, the user initiates order processing at step 912. During the checkout process, at step 914 a custom document based in part on the component elements is automatically generated and displayed to the user for possible purchase, as discussed above in connection with FIG. 8. At step 916, the user can select to purchase only the product designed by the user or can purchase both that product and the custom product.

While illustrative embodiments have been explained, alternate embodiments could also be employed. As one alternate embodiment, fewer user-controlled options could be provided. For example, font information and/or design information could be either or both incorporated into the layout definition. In this embodiment, document controls 600 would only contain color scheme and layout selection controls. While the invention has been discussed in the context of a holiday card, it will be appreciated that it can be applied to a wide range of materials for commercial and personal use. Therefore, the described embodiments are to be considered as illustrative rather than restrictive and the scope of the invention is as indicated in the following claims and all equivalent methods and systems.

What is claimed is:

1. A system comprising:
   non-transitory computer readable memory storing a database comprising a plurality of template components used to assemble a template image, the plurality of template components each associated with a respective different template component identifier and the plurality of template components categorized into a plurality of template component categories, said categories including a layout category and one or more of a design category, an image category, a text group category, a font scheme category, and a color scheme category, wherein template components belonging to the layout category specify at least size and positioning of all containers in the respective layout, said database further comprising one or more associations between layout template components; and one or more processors configured to receive a product description identifier associated with a user document, the product description identifier associated with a plurality of template component identifiers from the layout category and at least one other different template component category and which in combination with user-supplied content represents the user document, said one or more processors further configured to assemble a different document using at least one or more of the template components of the user document as identified from the template component identifiers associated with the product description identifier of the user document, and further using at least one different template component from the plurality of template components stored in the database.

2. The system of claim 1, wherein the different document incorporates at least one or more of the user-supplied content.

3. The system of claim 1, wherein the different document is assembled using a different layout than the layout of the user document, the different layout and the layout of the user document being associated in the database and the different layout being selected by the one or more processors based on the association in the database.

4. The system of claim 3, wherein the layout of the user document and the different layout are associated as being different areas on a single product.

5. The system of claim 3, wherein the layout of the user document is a first side of a printed document and the different layout is a second side of the printed document.

6. The system of claim 1, wherein the different document is presented to the user.

7. The system of claim 1, wherein the different document is assembled without user request.

8. The system of claim 1, wherein the user document comprises product specific template component elements and user-editable template component elements, and wherein the different document comprises at least one different product specific template component element and at least one of the user-editable template component elements of the user document.

9. A printed product embodying the different document assembled by the system of claim 1.

10. A system comprising:
one or more processors configured to obtain a user selection of a desired template and to indicate the selection to a server computer, the desired template associated with a first set template component elements each associated with a corresponding template component element identifier, the first set of template component elements categorized into a plurality of component categories including a layout category and one or more of a design category, an image category, a text group category, a font scheme category, and a color scheme category, wherein template components belonging to the layout category specify at least size and positioning of all containers in the respective layout;

the one or more processors further configured to receive in response to the user selection, a product description identifier associated with a user document and the corresponding template component elements associated with the plurality of template component element identifiers associated with the desired template;

the one or more processors further configured to combine the received template component elements into the user document and to display the user document on a display screen together with active edit controls that allow the user to insert user-supplied content and to change one or more of the template component elements of the user document and to thereby replace a template component element identifier associated with the product description identifier with a different template component element identifier from the same template component category;

the one or more processors further configured to send the product description identifier and its associated template component elements to the server upon receipt of indication that the user edits are complete;

the one or more processors further configured to receive a second set of template component elements associated with a second document, the second set of template component elements each associated with a corresponding template component element identifier and categorized into the plurality of component categories including the layout category and one or more of the design category, the image category, the text group category, the font scheme category, and the color scheme category, the corresponding template component identifiers of the template component elements in the second set comprising at least one template component identifier that is identical to a template component identifier in a corresponding category in the first set of template component elements, and at least one template component identifier that is different than a template component identifier in a corresponding category in the first set of template component elements, the one or more processors further configured to display the second document to the user.

11. The system of claim 10, further comprising:
one or more processors configured to allow a user to order a product embodying the user document and the second document.

12. The system of claim 10, wherein the second document is received and assembled without request from the user.

13. The system of claim 10, wherein the second document incorporates at least some of the user content.

14. The system of claim 10, wherein the second document is assembled using a different layout than the user document, the different layout and the layout of the user document being associated at the server computer.

15. The system of claim 10, wherein the user document comprises product specific template component elements and user-editable template component elements, and wherein the different document comprises at least one different product specific template component element and at least one of the user-editable template component elements of the user document.

16. A printed product embodying the second document as assembled by the system of claim 10.

17. A non-transitory memory for storing data for access by a program being executed by one or more processors, comprising:
a database stored in said memory and used by said program, said database comprising:

a plurality of template components used to assemble a template image, the plurality of template components each associated with a respective different template component identifier and the plurality of template components categorized into a plurality of template component categories, said categories including a layout category and one or more of a design category, an image category, a text group category, a font scheme category, and a color scheme category, wherein template components belonging to the layout category specify at least size and positioning of all containers in the respective layout; and one or more associations between layout template components, each association indicating one or more layout template component element identifiers that are associated with a given layout template component element and which may be used by the program to identify and generate a template that matches a user document, the user document identified by a product description identifier associated with a plurality of template component identifiers from the layout category and at least one other different template component category and which in combination with user-supplied content represents the user document, the association indicating to the program that an associated layout template element may be combined with at least one or more of the template component elements of the user document to generate a matching template that appears to match the user document.

\* \* \* \* \*